(12) United States Patent
De France et al.

(10) Patent No.: US 8,777,679 B2
(45) Date of Patent: Jul. 15, 2014

(54) ELECTRICAL CONNECTOR ADAPTED TO RECEIVE VARIOUS DIAMETER CABLE

(75) Inventors: Robert Victor De France, Poughkeepsie, NY (US); Daniel David Dobrinski, Hillsboro, NH (US)

(73) Assignee: Hubbell Incorporated, Shelton, CT (US)

(*) Notice: Subject to any disclaimer, the term of this patent is extended or adjusted under 35 U.S.C. 154(b) by 211 days.

(21) Appl. No.: 13/527,911

(22) Filed: Jun. 20, 2012

(65) Prior Publication Data

US 2013/0045645 A1 Feb. 21, 2013

Related U.S. Application Data

(60) Provisional application No. 61/525,377, filed on Aug. 19, 2011.

(51) Int. Cl.
*H01R 4/40* (2006.01)

(52) U.S. Cl.
USPC .......................................... 439/879

(58) Field of Classification Search
USPC ............... 174/79, 74 R, 84 R, 88 S; 439/879
See application file for complete search history.

(56) References Cited

U.S. PATENT DOCUMENTS

| | | | |
|---|---|---|---|
| 2,958,723 A * | 11/1960 | Logan et al. | 174/84 C |
| 2,988,727 A | 6/1961 | Berndt | |
| 3,213,186 A * | 10/1965 | Raila et al. | 174/84 C |
| 3,378,892 A | 4/1968 | Vano | |
| 4,362,352 A | 12/1982 | Hawkins | |
| 4,370,016 A | 1/1983 | Hayes | |
| 4,575,133 A | 3/1986 | Nattel | |
| 4,698,031 A | 10/1987 | Dawson | |
| 4,744,622 A | 5/1988 | Cherry | |
| 5,975,949 A | 11/1999 | Holliday | |
| 6,015,953 A | 1/2000 | Tosaka | |
| 6,805,596 B2 * | 10/2004 | Quesnel et al. | 439/877 |
| 7,019,217 B2 | 3/2006 | Bryant | |
| 7,160,156 B2 | 1/2007 | Holliday | |
| 7,304,243 B2 | 12/2007 | Polidori | |
| 7,342,175 B2 * | 3/2008 | De France | 174/84 R |
| 7,385,138 B2 | 6/2008 | De France | |
| 7,407,411 B2 | 8/2008 | Byrne | |
| 7,435,144 B2 | 10/2008 | Waltz | |
| 7,563,983 B2 | 7/2009 | Bryant | |
| 7,858,882 B2 * | 12/2010 | DeFrance | 174/79 |
| 8,282,429 B2 * | 10/2012 | Glick et al. | 439/843 |
| 2007/0066153 A1 | 3/2007 | De France | |
| 2010/0190389 A1 | 7/2010 | DeFrance | |
| 2011/0084180 A1 | 4/2011 | Toimil | |

OTHER PUBLICATIONS

International Search Report and Written Opinion issued in PCT/US12/50243 dated Oct. 16, 2012.

* cited by examiner

*Primary Examiner* — Neil Abrams
*Assistant Examiner* — Phuongchi T Nguyen
(74) *Attorney, Agent, or Firm* — Kyle Hepner; Mark S. Bicks; Alfred N. Goodman

(57) ABSTRACT

An electrical connector includes a body having a crimpable tubular portion. A bore is formed in the tubular portion. A plurality of partially cylindrical jaw segments are disposable in the bore. The plurality of jaw segments form an opening for receiving a cable. A nose guide is disposable in the bore to facilitate retaining the plurality of jaw segments in the body.

18 Claims, 5 Drawing Sheets

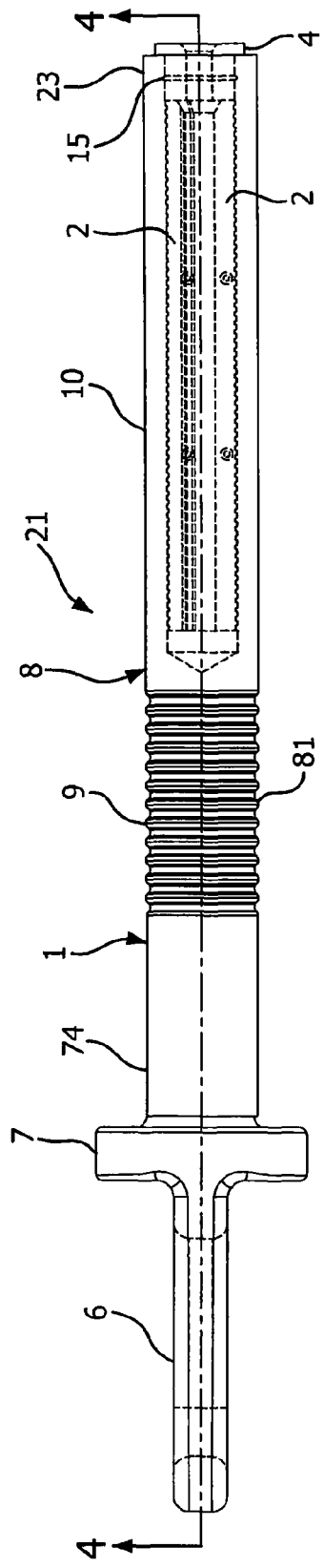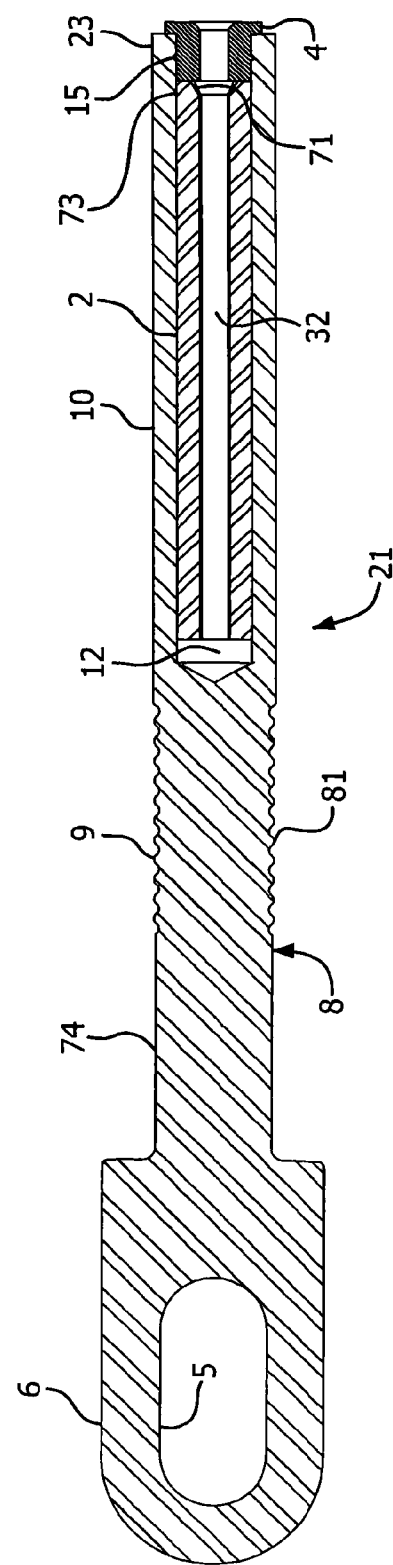

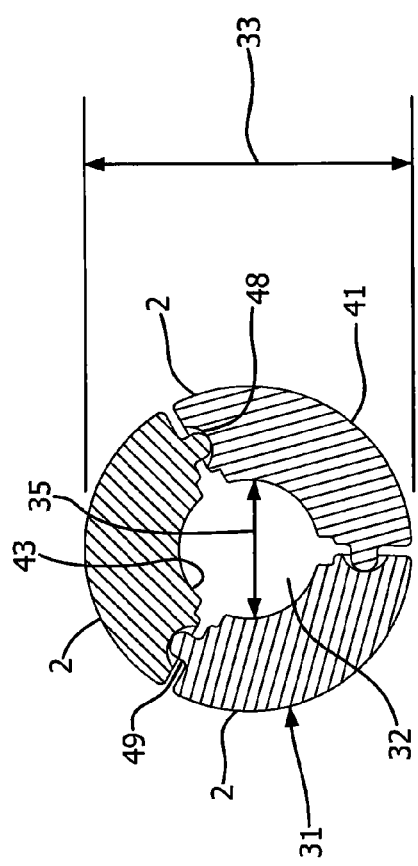
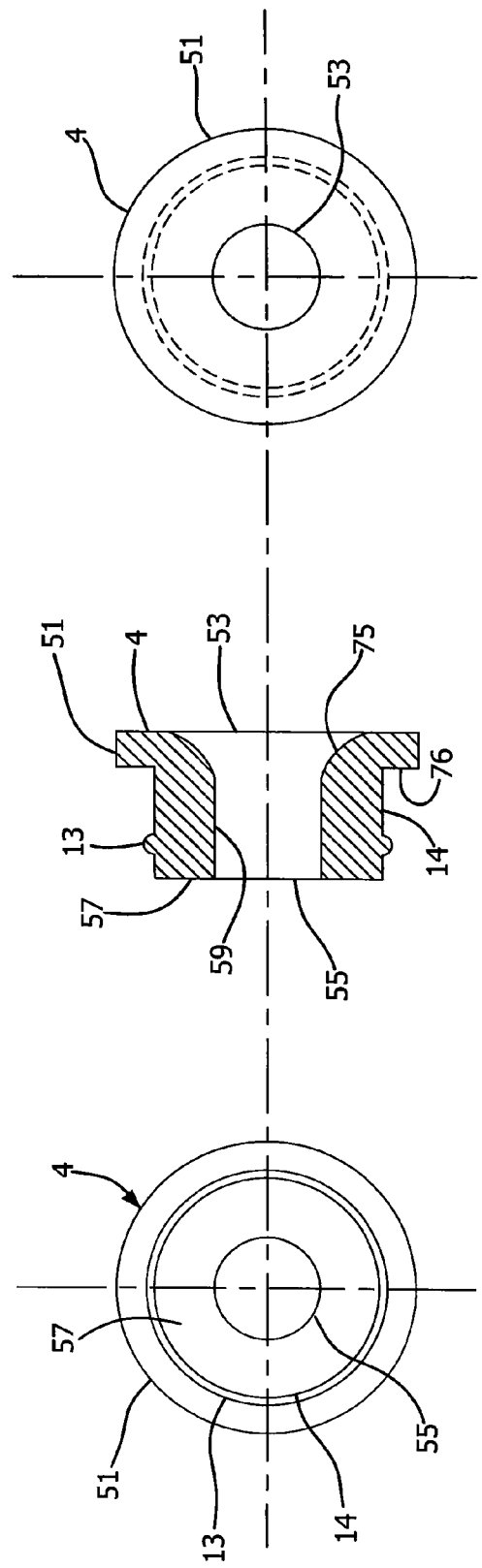

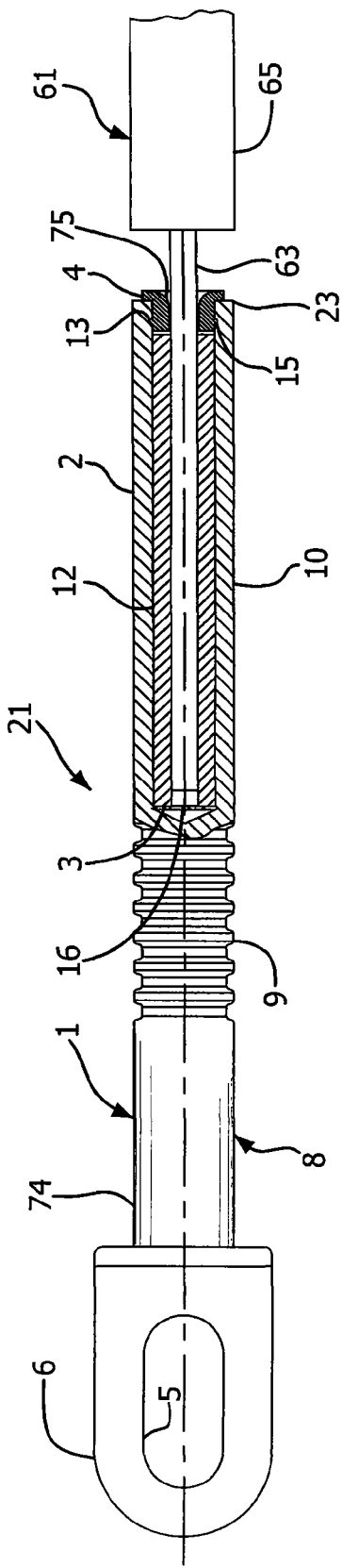
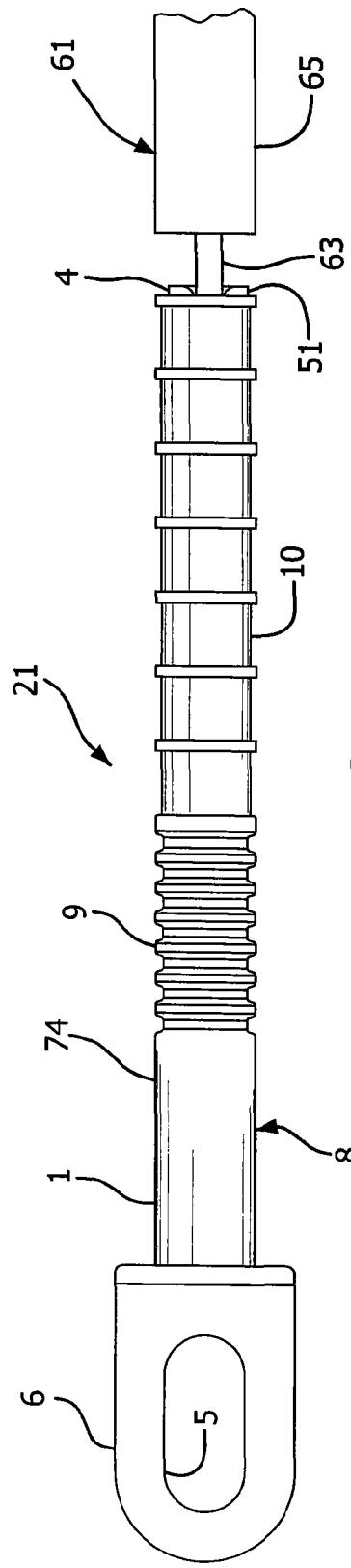

ELECTRICAL CONNECTOR ADAPTED TO RECEIVE VARIOUS DIAMETER CABLE

CROSS-REFERENCE TO RELATED APPLICATION

This application claims the benefit under 35 U.S.C. §119 (e) of U.S. Provisional Application Ser. No. 61/525,377, filed Aug. 19, 2011, which is hereby incorporated by reference in its entirety.

FIELD OF THE INVENTION

The present invention relates generally to an electrical connector adapted to receive various diameter cable. More particularly, the present invention relates to an electrical connector adapted to receive various diameter core and stranded (C-S) cable. Still more particularly, the present invention relates to an electrical connector having a tubular portion that receives jaw segments of different thickness to accommodate various diameter cable.

BACKGROUND OF THE INVENTION

Core and stranded (C-S) cables are conventional, such as an Aluminum Conductor Steel Reinforced (ACSR) cable, an Aluminum Conductor Composite Core (ACCC) cable, and an Aluminum Conductor Steel Supported (ACSS) cable. One example of a C-S cable is described in U.S. Pat. No. 7,385,138, which is hereby incorporated by reference in its entirety. The cable has a core and strands of electrically conductive metal wrapped around the core. The core functions as a support to allow the cable to be supported over an extended length from opposite ends, such as in overhead high tension lines used in high voltage power distribution networks. The core can be a light-weight advanced composite core, such as a carbon composite. The metal conductor strands function as electrical conductors. C-S cables also increase the current carrying capacity while providing a lighter cable. The strands can be made of aluminum.

Electrical connectors are used to mechanically and electrically connect the C-S cables. Examples of electrical connectors for C-S cables are described in U.S. Pat. Nos. 6,805,596, 6,015,953 and 7,019,217. Screw-on inner sleeves of electrical connectors prevent excessive compression on a composite core of an ACCC cable, which otherwise can result in damage to the core. However, installation of the screw-on inner sleeves can be labor intensive.

Conventional electrical connectors for C-S cables are manufactured having various inside diameters. The appropriate electrical connector is selected based on the diameter of the cable being connected. Each conventional electrical connector can receive only one cable diameter corresponding to the inner diameter of the electrical connector. Thus, a large and expensive inventory of cable connectors are required to accommodate the various diameter cables encountered in the field.

SUMMARY OF THE INVENTION

An object of the present invention is to provide an electrical connector that prevents excessive compression of the core of a C-S cable.

Another object of the present invention is to provide an electrical connector adapted to accommodate C-S cables of various diameters.

In accordance with one aspect of the present invention, an electrical connector is provided including an end member configured to connect the electrical connector to another member and a plurality of jaw segments received by the electrical connector. The plurality of jaw segments are configured to be arranged relative to one another to directly contact a core of a core and stranded (C-S) cable. Each of the jaw segments is configured to contact a different portion of the outer perimeter of the core, such that the entire outer perimeter of the core is surrounded by the plurality of jaw segments. A tubular portion of the connector receives the plurality of jaw segments and surrounds a majority of the plurality of jaw segments.

In accordance with another aspect of the invention, a method is provided including arranging a plurality of jaw segments around an end of a core of a core and stranded (C-S) cable such that the plurality of jaw segments directly contact different portions of the outer perimeter of the core to substantially surround the core. The plurality of jaw segments are received by a tubular portion of an electrical connector. An end member of the electrical connector can be connected to another member. The tubular portion surrounds the plurality of jaw segments along a majority of length of the jaw segments, thereby retaining the jaw segments together. The tubular portion is preferably directly connected to the end member.

The foregoing objectives are basically attained by an electrical connector including a body having a crimpable tubular portion. A bore is formed in the tubular portion. A plurality of partially cylindrical jaw segments are disposable in the bore. The plurality of jaw segments form an opening for receiving a cable. A nose guide is disposed in the bore to facilitate retaining the plurality of jaw segments in the body.

The foregoing objectives are also basically attained by an electrical connector including a body having a crimpable tubular portion. A bore is formed in the tubular portion. A first plurality of partially cylindrical jaw segments are disposable in the bore. The plurality of jaw segments form an opening for receiving a first cable having a first diameter and having an outer surface contacting the bore.

The foregoing objectives are also basically attained by a method of securing a cable with an electrical connector. A cable is passed through a nose guide. The cable is passed through an opening formed in a plurality of jaw segments. The plurality of jaw segments are inserted in a bore in a body of the electrical connector. The nose guide is inserted in the bore after inserting the plurality of jaw segments to facilitate retaining the plurality of jaw segments in the body of the electrical connector.

Objects, advantages, and salient features of the invention will become apparent from the following detailed description, which, taken in conjunction with the annexed drawings, discloses an exemplary embodiment of the present invention.

As used in this application, the terms "front," "rear," "upper," "lower," "upwardly," "downwardly," and other orientational descriptors are intended to facilitate the description of the exemplary embodiment of the present invention, and are not intended to limit the structure thereof to any particular position or orientation.

BRIEF DESCRIPTION OF THE DRAWINGS

The above benefits and other advantages of the various embodiments of the present invention will be more apparent from the following detailed description of exemplary embodiments of the present invention and from the accompanying drawing figures, in which:

FIG. 3 is a top plan view of the electrical connector of FIG. 1;

FIG. 4 is a side elevational view in section along line 4-4 of the electrical connector of FIG. 3;

FIG. 5 is a front elevational view in cross section of a plurality of jaw segments of the electrical connector of FIG. 1;

FIG. 6 is a rear elevational view of a nose guide of the electrical connector of FIG. 1;

FIG. 7 is a side elevational view in cross section of the nose guide of FIG. 6;

FIG. 8 is a front elevational view of the nose guide of FIG. 6;

FIG. 9 is a side elevational view in partial cross section of a cable core received by the electrical connector of FIG. 1;

FIG. 10 is a side elevational view of the electrical connector of FIG. 9 crimped to securely retain the cable core therein;

Throughout the drawings, like reference numerals will be understood to refer to like parts, components and structures.

DETAILED DESCRIPTION OF EXEMPLARY EMBODIMENT

Figure 1:
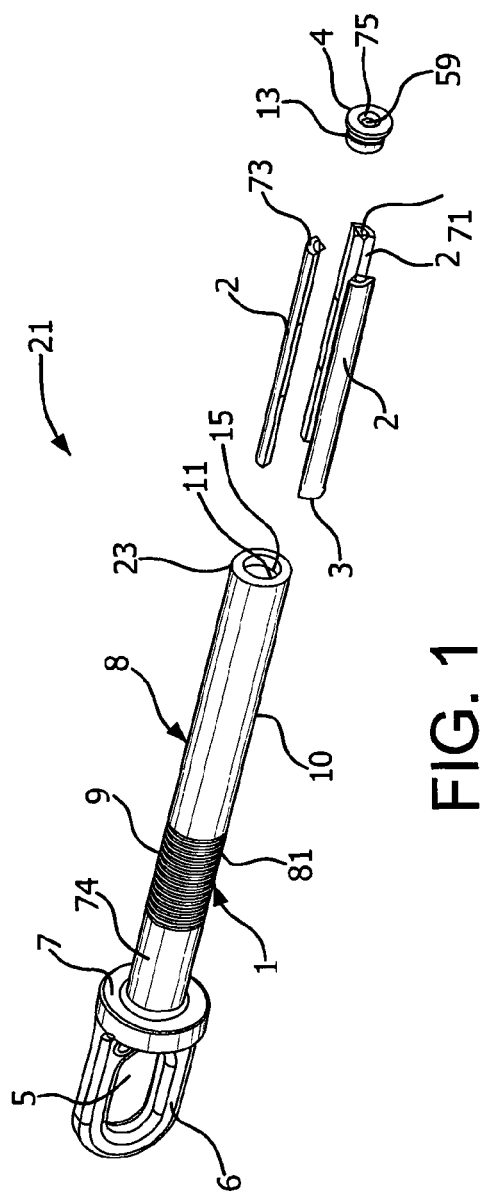
FIG. 1 is an exploded perspective view of an electrical connector in accordance with an exemplary embodiment of the present invention.

The electrical connector 21 includes a body 1 and a plurality of partially cylindrical jaw segments 2 received by the body, as shown in FIGS. 1-4. The electrical connector 21 includes the body 1 having a crimpable tubular portion 10. A bore 12 is formed in the tubular portion 10. The plurality of jaw segments 2 are disposable in the bore 12. The plurality of jaw segments 2 form an opening 32 for receiving a core 63 of cable 61. A nose guide 4 is disposable in the bore 12 to facilitate retaining the plurality of jaw segments 2 in the body 1.

The body 1 of the electrical connector 21 includes an end member 6 configured to connect the electrical connector to another member. An opening 5 is formed in the end member 6. Preferably, the opening 5 has a substantially oval shape. The end member 6 is connected to a flange 7. The flange 7 is connected to a cylindrical member 8 of the body 1 and has a first portion 74, second portion 9 and third portion 10. Preferably, the first portion 74 of the cylindrical member 8 is substantially solid and extends outwardly from the flange 7. The second portion 9 of the cylindrical member 8 extends outwardly from the first portion 74 and is also substantially solid. A plurality of ribs 81 extend around the entire circumference of the second portion 9 of the cylindrical member 8. The third, or tubular, portion 10 of the cylindrical member 8 is substantially a right circular cylinder, as shown in FIGS. 1-4, and extends outwardly from the second portion 9.

A bore 12 extends inwardly from an opening 11 in a free end 23 of the tubular portion 10 to receive the plurality of jaw segments 2. As shown in FIG. 5, the jaw segment assembly 31 has an outer diameter 33 and an inner diameter 35. The outer diameter of the jaw segment assembly is always substantially the same to be received by the bore 12 of the tubular portion 10. The inner diameter 35 of the jaw segment assembly 31 varies depending on the diameter of the cable core 63 (FIGS. 9 and 10) being received. Accordingly, only a single bore size of the tubular portion 8 of the body 1 of the electrical connector 21 is necessary. The various diameter cores are accommodated by varying the inner diameter 35 of the jaw segment assembly 31. Thus, various wall thicknesses (distance from an outer surface 41 to an inner surface 43 of the jaw segment 2) of the jaw segments 2 are selected to receive the corresponding diameter cable core 63. A universal body 1 is provided that receives one of a variety of jaw segment assemblies 31 having a different inner diameter 35 based on the diameter cable core being received. Therefore, only one size body 1 of the electrical connector 21 is kept in inventory. A plurality of the various sized jaw segments 2 are kept in inventory to accommodate the various diameter cable cores, thereby reducing the associated inventory costs.

Figure 2:
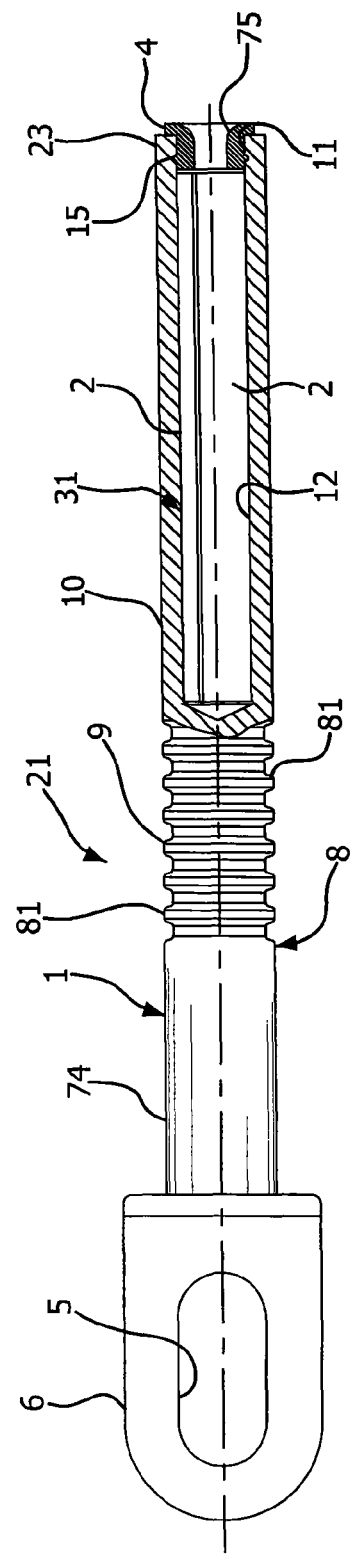
FIG. 2 is a side elevational view in partial section of the electrical connector of FIG. 1.
Figure 11:
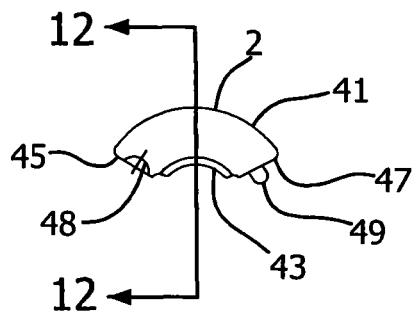
FIG. 11 is a front elevational view of a jaw segment of FIG. 5.
Figures 13, 14:
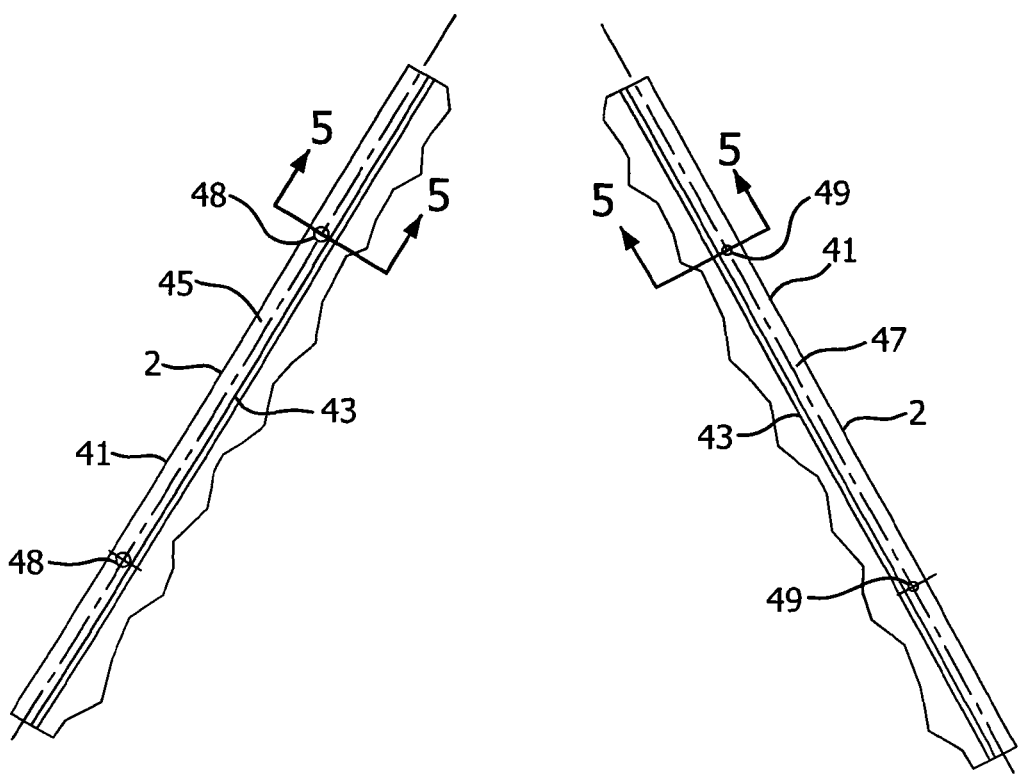
FIG. 13 is a side elevational view of a first side wall of the jaw segment of FIG. 11.
FIG. 14 is a side elevational view of a second side wall face of the jaw segment of FIG. 11.

As shown in FIGS. 1 and 5, three jaw segments 2 are preferably used, although any suitable number of jaw segments can be used. The jaw segments 2 preferably are partially cylindrical as shown in FIG. 1 and have a substantially arcuate shape in section, as shown in FIGS. 5 and 11. A first side wall 45 extends from the inner surface 43 to the outer surface 41, and extends longitudinally along the length of the jaw segment, as shown in FIGS. 11 and 13. A second side wall 47 extends from the inner surface 43 to the outer surface 41, and extends longitudinally along the length of the jaw segment 2, as shown in FIGS. 11 and 14. The first and second side walls 45 and 47 are preferably substantially planar. The length of the jaw segments 2 is less than the length of the bore 12, as shown in FIG. 2, such that the entire length of each jaw segment 2 is received in the bore 12 in the tubular portion 10 of the body 1 of the electrical connector 21. The jaw segments 2 are preferably substantially identical.

Figure 12:
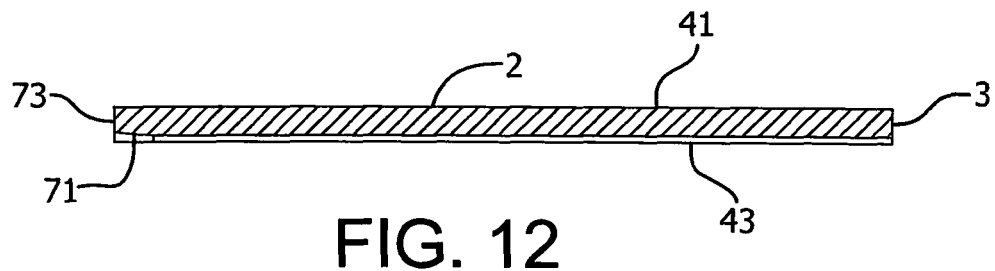
FIG. 12 is a side elevational view in cross section along line 12-12 of the jaw segment of FIG. 11.

When the jaw segments 2 receive a cable core 63, as shown in FIG. 9, the first side wall 45 of one jaw segment 2 abuts the second side wall 47 of the adjacent jaw segment to substantially completely surround the cable core 63. When the jaw segment assembly 31 is formed, as shown in FIG. 5, an opening 32 is defined by inner surfaces 43 of the plurality of jaw segments 2 to receive the cable core 63. A plurality of openings 48 disposed in the first side wall 45 are received by corresponding projections 49 extending outwardly from the second side wall 47 of an adjacent jaw segment, as shown in FIGS. 5, 13 and 14. The engagement between the openings 48 and projections 49 of mating jaw segments substantially prevents movement of the jaw segments with respect to one another when inserting the jaw segment assembly 31 in the bore 12 of the tubular portion 10. By varying the wall thickness of the jaw segments 2 while maintaining the same outer diameter 33, a variety of different diameter cable cores can be received by the same bore 12 of the body 1. An outwardly tapered portion 71 proximal a second end 73 of the jaw segment 2 facilitates receiving the cable core 63, as shown in FIGS. 9 and 12.

The jaw segments 2 are retained in the bore 12 of the tubular portion 10 section by a nose guide 4, as shown in FIGS. 2-4 and 9. The nose guide 4, as shown in FIGS. 6-8, has a base 51 and a wall 14 extending outwardly from the base. A circumferentially extending rib 13 extends outwardly from the wall 14 of the nose guide 4. A first opening 53 is formed in the base 51 and a second opening 55 is formed in the free end 57 of the wall 14. A passageway 59 extends from the first opening 53 to the second opening 55 to allow a cable core 63 of the cable 61 to pass through the nose guide 4, as shown in FIGS. 9 and 10. The nose guide rib 13 is received by a corresponding groove 15 in the bore 12 proximal the free end 23 of the tubular portion 10 to facilitate retaining the jaw segments 2 within the tubular portion 10. The passageway 59 can have an outwardly tapering portion 75 proximal the first opening 53, as shown in FIG. 7, to facilitate receiving the cable core 63.

The bore 12 of the tubular portion 10 of the body 1 accepts a wide range of cable core diameters by using various jaw segments 2 having different wall thicknesses. The jaw segments 2 are disposed relative to one another to directly contact the cable core of the stranded (C-S) cable. Each of the jaw segments 2 is configured to contact a different portion of the outer perimeter of the cable core to substantially surround the entire circumference of the cable core.

Preferably, the body 1 of the electrical connector 21 is unitarily formed as a single piece. The body 1 and the jaw segments 2 are preferably made of stainless steel, although any suitable material may be used. The nose guide 4 is preferably made of plastic.

Assembly and Operation

An assembled electrical connector 21 is shown in FIGS. 9 and 10. A plurality of jaw segments 2 receiving the cable core 63 are disposed within the bore 12 of the tubular portion 10 of the body 1 of the electrical connector 21. The nose guide 4 is disposed in the tubular portion 10 to facilitate retaining the jaw segments 2 in the body 1 of the electrical connector 21.

A conventional C-S cable 61 includes the core 63 and strands of electrically conductive metal 65 wrapped around the core, as shown in FIGS. 9 and 10. The cable core 63 is passed through the nose guide 4 and surrounded by the plurality of jaw segments 2. The tapered portion 75 of the passageway 59 proximal the first opening 53 in the nose guide 4 facilitates passing the cable core 63 through the nose guide. The jaw segment assembly 31 can be pre-formed and the cable core 63 inserted in the opening 32 formed by the assembled jaw segments 2, as shown in FIG. 5. The tapered portions 71 of the jaw segments 2 facilitate inserting the cable core 63 in the opening 32 in the pre-formed jaw segment assembly 31. The plurality of jaw segments 2 are inserted in the bore 12 of the tubular portion 10 of the body 1 of the electrical connector 21, as shown in FIG. 9. The plurality of jaw segments 2 are preferably inserted in the bore 12 until first ends 3 of the jaw segments abut an end 16 of the bore. The outer surface 41 of each of the jaw segments 2 of the jaw segment assembly 31 (FIG. 5) contacts the bore 12 of the tubular portion 10, as shown in FIGS. 2 and 9, when the jaw segment assembly 31 is inserted in the tubular portion 10 with the cable core 63.

The nose guide 4 is then inserted in the bore 12 until the nose guide rib 13 is received by the groove 15 in the bore 12, as shown in FIG. 9. An inner surface 76 (FIG. 7) of the flange 51 abuts the end 23 of the tubular portion 10, as shown in FIGS. 9 and 10, to limit the insertion depth of the nose guide 4 in the tubular portion 10 of the body 1 of the electrical connector 21. The tubular portion 10 of the connector 1 is then crimped in a conventional manner, as shown in FIG. 10, to securely retain the cable core 63 within the tubular portion 10 of the connector 21.

The foregoing embodiment and advantages are merely exemplary and are not to be construed as limiting the scope of the present invention. The description of an exemplary embodiment of the present invention is intended to be illustrative, and not to limit the scope of the present invention. Various modifications, alternatives and variations will be apparent to those of ordinary skill in the art, and are intended to fall within the scope of the invention as defined in the appended claims and their equivalents.

What is claimed is:

1. An electrical connector, comprising:
a body including a crimpable tubular portion having a bore formed therein;
a plurality of partially cylindrical jaw segments disposable in said bore, said plurality of jaw segments forming an opening for receiving a cable; and
a nose guide disposable in said bore to facilitate retaining said plurality of jaw segments in said body, said nose guide having a flange to limit an insertion depth of said nose guide into said bore and having a rib resisting removal of said nose guide from said bore.

2. The electrical connector according to claim 1, wherein said rib is a circumferentially extending rib and a groove in said bore receives said circumferentially extending rib on said nose guide to facilitate engaging said nose guide with said body.

3. The electrical connector according to claim 1, wherein a length of each of said plurality of jaw segments is less than a length of said bore.

4. The electrical connector according to claim 1, wherein an opening in said nose guide has an outwardly tapering portion to facilitate receiving the cable.

5. The electrical connector according to claim 1, wherein an end of said jaw segment tapers outwardly.

6. The electrical connector according to claim 1, wherein each jaw segment has first and second longitudinally extending side walls, said first longitudinally extending side wall has a plurality of outwardly extending projections and said second longitudinally extending side wall has a plurality of openings such that said plurality of projections of one jaw segment are received by said plurality of openings of an adjacent jaw segment when said plurality of jaw segments are disposed in said bore.

7. The electrical connector according to claim 1, wherein an outer surface of said body has a plurality of circumferentially extending ribs.

8. The electrical connector according to claim 1, wherein said plurality of jaw segments comprises three jaw segments.

9. An electrical connector, comprising:
a body including a crimpable tubular portion having a bore formed therein;
a first plurality of partially cylindrical jaw segments disposable in said bore, said plurality of jaw segments forming an opening for receiving a first cable having a first diameter and having an outer surface contacting said bore; and
a nose guide disposable in said bore to facilitate retaining said plurality of jaw segments in said body, said nose guide having a flange to limit an insertion depth of said nose guide into said bore and having a rib resisting removal of said nose guide from said bore.

10. The electrical connector according to claim 9, wherein each jaw segment has first and second longitudinally extending side walls, said first longitudinally extending side wall has a plurality of outwardly extending projections and said second longitudinally extending side wall has a plurality of openings such that said plurality of projections of one jaw segment are received by said plurality of openings of an adjacent jaw segment when said plurality of jaw segments are disposed in said bore.

11. The electrical connector according to claim 9, wherein an outer surface of said body has a plurality of circumferentially extending ribs.

12. The electrical connector according to claim 9, wherein
a second plurality of jaw segments are disposable in said bore instead of said first plurality of jaw segments to receive a second cable having a second diameter.

13. The electrical connector according to claim 12, wherein
said first and second plurality of jaw segments have substantially equal outer diameters.

14. The electrical connector according to claim 12, wherein
said first and second plurality of jaw segments have different thicknesses.

15. A method of securing a cable with an electrical connector, comprising the steps of
passing a cable through a nose guide having a flange limiting an insertion depth of said nose guide and a rib resisting removal of said nose guide;
passing the cable through an opening formed in a plurality of jaw segments;
inserting the plurality of jaw segments in a bore in a body of the electrical connector; and
inserting the nose guide in the bore after inserting the plurality of jaw segments to facilitate retaining the plurality of jaw segments in the body of the electrical connector.

16. The method of securing a cable with an electrical connector according to claim 15, further comprising
crimping the body of the electrical connector to securely retain the cable therein.

17. The method of securing a cable with an electrical connector according to claim 15, further comprising
selecting the plurality of jaw segments based on a diameter of the cable.

18. The method of securing a cable with an electrical connector according to claim 17, wherein
the plurality of jaw segments selected from have varying thicknesses to accommodate various diameter cables.

* * * * *